United States Patent [19]

Loughran

[11] Patent Number: 4,643,544

[45] Date of Patent: Feb. 17, 1987

[54] THREE VIEW IN ONE MIRROR

[76] Inventor: William P. Loughran, P.O. Box 173 Station A, Flushing, N.Y. 11358

[21] Appl. No.: 800,275

[22] Filed: Nov. 21, 1985

[51] Int. Cl.[4] ........................... B60R 1/04; G02B 5/08

[52] U.S. Cl. .................................... 350/615; 350/616; 350/627; 350/631

[58] Field of Search ............... 350/612, 615, 616, 631, 350/632, 625–627; D12/187; D6/300–302

[56] References Cited

U.S. PATENT DOCUMENTS

| | | | |
|---|---|---|---|
| 2,140,069 | 12/1938 | Bostwick | 350/615 |
| 2,869,425 | 1/1959 | Kershaw | 350/627 |
| 2,979,989 | 4/1961 | Calder, Jr. | 350/615 |
| 3,187,628 | 6/1965 | Canns et al. | 350/627 |
| 3,411,843 | 11/1968 | Moller | 350/627 |
| 3,480,350 | 11/1969 | Hamby | 350/615 |
| 3,977,774 | 8/1976 | O'Sullivan | 350/627 X |
| 4,025,173 | 5/1977 | Schmaedeke | 350/616 |
| 4,253,738 | 3/1981 | Linkous | 350/616 |
| 4,487,479 | 12/1984 | Tolomeo, Sr. | 350/615 |
| 4,575,202 | 3/1986 | McGuire | 350/615 X |

*Primary Examiner*—John Petrakes
*Attorney, Agent, or Firm*—Richard L. Miller

[57] ABSTRACT

A mirror assembly detachably attachable by Velcro loop pile fastener means to an automobile inside rear view mirror and including a row of mirrors that are angularly pivotable respective to each other for reflecting images from a rear and each opposite sideward direction.

2 Claims, 3 Drawing Figures

Fig. 1
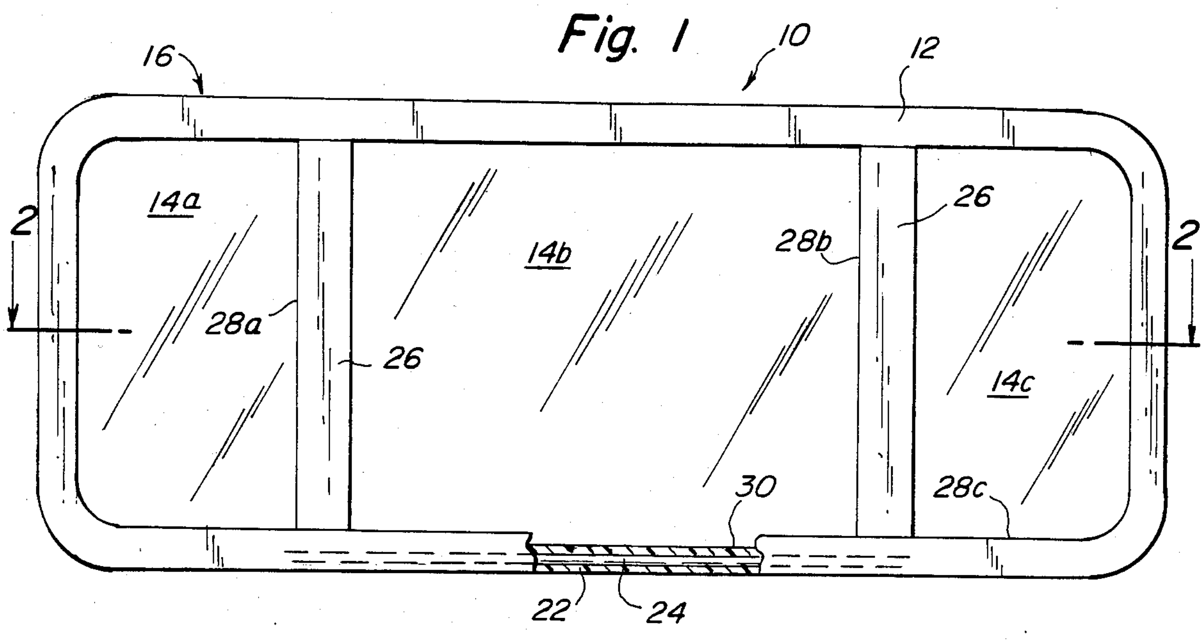
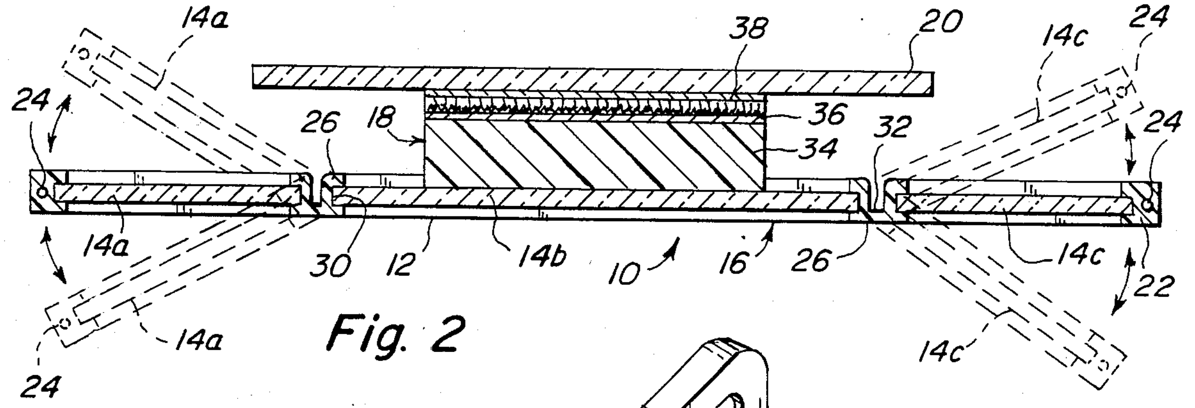
Fig. 2
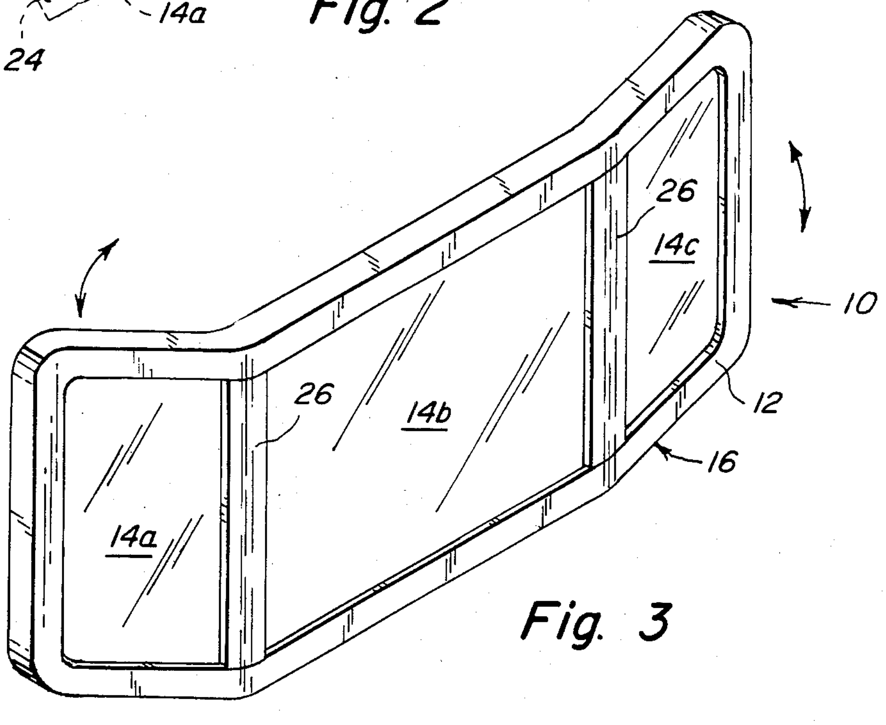
Fig. 3

THREE VIEW IN ONE MIRROR

BACKGROUND OF THE INVENTION

This invention relates generally to automotive accessories. More specifically it relates to rear view mirrors for automotive vehicles and is an improvement over multi-faceted rear view mirrors already known in the art such as are presented in the U.S. Pat. Nos. 3,977,774 to O'Sullivan; 4,253,738 to Linkous; and 4,025,173 to Schmaedeke. These mirrors present constructions wherein reflected images are received from two different directions at the same time.

SUMMARY OF THE INVENTION

A principal object of the present invention is to provide a mirror wherein reflected images may be received from three different directions at a same time, so as to give a still broaden scope of view to an observer.

Another object is to provide a three view in one mirror which may be manufactured to be angularly adjustable for precisely selecting the directions of the three images respective to each other.

Yet another object is to provide a three view in one mirror which is readily mountable on the regular rear view mirror inside an automotive vehicle so as to give the motorist a full range view of the left and right sides, as well as a rear, all at same time, and thereby eliminating the necessity of momentarily turning his head for seeing if any other cars in the next left or right lanes are moving up into his blind spots, when wanting to change his lane. Thus by not needing to turn his head away from a forward position, there is lessened the possibility of colliding into a car in front.

Other objects are to provide a three view in one mirror which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a front elevational view of the invention with parts broken away.

FIG. 2 is a cross sectional view taken along line 2—2 in FIG. 1 showing the invention mounted onto a conventional rear view mirror.

FIG. 3 is a perspective view of the invention per se.

DETAILED DESCRIPTION OF THE PREFERRED EMBODIMENT

Referring now to the Drawing in greater detail, the reference numeral 10 represents a three view in one mirror, according to the present invention, wherein there is a frame 12 and a set of three flat mirrors 14*a*, 14*b* and 14*c* that are set into the frame so as to form a singular unit 16. A holder 18 is affixed to a rear side of the unit in order to removably support the three view in one mirror from a conventional, regular rear view mirror 20 inside an automotive vehicle.

In the present invention, the frame comprises a tubular, rectangular member molded of flexible plastic material 22 and has a rectangular stiffener 24 imbedded within a center thereof; the stiffener being made of a bendable, springless, metal rod so as to retain any shape into which the frame may be bent. The rectangular frame also includes a pair of flexible plastic bars 26 formed integrally therewith and extending transversely there across so as to form three window openings 28*a*, 28*b* and 28*c* within the frame and into each of which one of the mirrors is snap fitted by seating in a groove 30 formed around all the edges of the frame window openings. Each bar 26 is "U"-shaped in cross sectional configuration in order to include a thin bending position 32 which permits the bar to bend like a hinge whenever one of end mirrors is angled respective to the center mirror, as shown by the dotted lines of the figure. Such bending along the bar extends across the metal rod located transversely near each end of the bar so as to retain the bent shape. Thus, in operative use, the three mirrors may be angled respective to each other, as shown in FIG. 3.

The holder comprises a base block 34 affixed to a rear side of the central mirror 14*b* by means of suitable adhesive; the base having a strip of VELCRO® loop pile fastener material 36 affixed thereto for attachment to a co-operative mating strip of VELCRO® loop pile fastener material 38 affixed to the surface of the vehicle regular mirror 20. The VELCRO® loop pile fastener strips have pressure sensitive adhesive on a rear side for quick and easy attachment to a supporting surface.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A three view in one mirror assembly, comprising, in combination, a bendable frame, a row of three rigid mirrors set in said frame, and a holder on a rear of a central portion of said mirrors for removable attachment on a regular rear view mirror inside an automotive vehicle, said frame being molded of flexible plastic material and comprising a stiffener formed of bendable springless metal rod embedded in said frame for retaining any shape into which the frame may be bent, and further comprising a pair of vertically extending spaced apart bars integrally formed with said frame for defining three window openings for receiving said three mirrors.

2. The combination as set forth in claim 1, wherein said holder comprises a block affixed to said central mirror and loop pile fastener means for said removable attachment.

* * * * *